United States Patent Office 3,471,447
Patented Oct. 7, 1969

3,471,447
PRODUCTION OF MOLDINGS FROM POLYURETHANE ELASTOMERS
Joachim Kunde, Frankenthal, Pfalz, and Hans Wilhelm and Helmut Doerfel, Ludwigshafen (Rhine), Germany, assignors to Badische Anilin- & Soda-Fabrik Aktiengesellschaft, Ludwigshafen (Rhine), Germany
No Drawing. Filed Dec. 17, 1965, Ser. No. 514,689
Claims priority, application Germany, Dec. 23, 1964, B 79,872
Int. Cl. C08g 22/10
U.S. Cl. 260—75      3 Claims

ABSTRACT OF THE DISCLOSURE

This specification discloses polyurethanes made from organic polyisocyanates and polyesters prepared by reacting adipic acid and a mixture of diols comprising 1,6-hexanediol and 2,2-dimethyl-1,3-hexanediol. The polyurethanes are suitable for producing fibers and sheeting and have good resistance to hydrolysis.

---

This invention relates to a process for the production of moldings from elastomers containing urethane groups and/or urea groups and/or semicarbazide groups by reaction of polyesters of adipic acid, hexanediol-1,6 and 2,2-dimethylhexanediol-1,3 with isocyanates and chain lengthening agents.

Elastomers containing urethane groups are usually prepared by reacting polyesters or polyethers having terminal hydroxyl groups with an excess of diisocyanates and causing the resultant prepolymers having terminal isocyanate groups to react with practically stoichiometric amounts of a bifunctional chain lengthening agent, such as a diamine, hydrazine or diol. The reaction may be carried out in the absence or presence of polar solvents. The elastomers obtained are used for industrial purposes in the form of moldings, such as elastic films, filaments, threads or strips.

In addition to a number of other properties such as strength, elongation and resilience, the properties of resistance to light, oxidation and hydrolysis are significant for textile use of elastomers. These properties are very substantially determined by the choice of the starting materials for the elastomers. Requirements as to an optimum property spectrum remain unsatisfied in spite of a large number of proposals.

Thus textiles of elastomers formed on the basis of polyethers, for example polytetrahydrofuran, have the advantage of being washproof, but they are very sensitive to the action of light and oxidising agents and therefore require to be specially stabilised. This disadvantage of sensitivity to light and oxidation of polyetherurethanes which in prolonged use of these products cannot be entirely obviated even by intense stabilisation, also occurs to a smaller extent when polyesters are used instead of polyethers in the production of elastic fibres. Polyesterurethanes, whose polyester component consists of conventional dicarboxylic acids and diols, such as adipic acid and ethylene glycol, butanediol-1,4 and propylene glycol-1,2, however have low stability to hydrolysis. The ester groups of the polymers are attacked by the chemical reagents, particularly alkalies, used in laundries, so that strength suffers. The action of strong alkalies may result in complete destruction of the polymers. Polyesters which contain diols having greater chain length, for example hexanediol-1,6 or decanediol-1,10, have therefore been used for the production of elastomers.

While polymers prepared from polyesters containing such diols are more resistant to hydrolysis, they have a great tendency to crystallise at low temperatures and consequently they have less favourable elastic properties.

It is furthermore known that resistance to hydrolysis of elastomers may be improved and at the same time their tendency to crystallise may be decreased by incorporating into the polyester component branched alcohols, particularly 2,2'-dimethylpropanediol-1,3 or butanediol-2,3.

Elastomers prepared with the coemployment of these alcohols still need to be improved as regards their elastic properties at low temperatures.

It is an object of this invention to provide a process for the production of elastomers having improved resistance to hydrolysis.

It is another object of the invention to provide a process for the production of elastomers having improved elasticity at low temperatures.

It is yet another object of the invention to provide a process for the production of elastomers having increased light fastness.

We have found that moldings of elastomers containing urethane groups and/or urea groups and/or semicarbazide groups which have high light fastness, good elasticity and outstanding resistance to hydrolysis can be prepared advantageously by reaction of polyesters which contain at least two hydroxyl groups and which have a molecular weight of from 500 to 5000 (prepared from adpic acid and a diol mixture) first with polyisocyanates and then with chain lengthening agents, in the presence or absence of indifferent polar solvents, followed by molding, if desired while removing the solvent, when the polyester containing at least two hydroxyl groups used is one which has been prepared from adipic acid and a diol mixture consisting of 45 to 90% by weight of hexanediol-1,6 and 10 to 55% by weight of 2,2-dimethylhexanediol-1,3.

From what is known regarding the constitution of similar prior art elastomers, it is surprising that elastomers from the polyesters proposed according to the present invention should not only have good stability to light and oxidation which is clearly superior to that of elastomers based on polyethers, but should also have better resistance to hydrolysis and better elasticity at low temperatures than polyesters previously used.

The elastic polymers are prepared by conventional methods by modifying the polyester to be used according to this invention with an excess of a diisocyanate, for example with a molar excess, and reacting the isocyanate-modified polyester with a chain lengthening agent. Depending on the type of chain lengthening agent, the lengthening of the chain may be carried out in the presence or absence of indifferent polar solvents. For example if diols are used, indifferent polar solvents are not necessary. The elastomers thus prepared may be molded in the usual way via their melts. Reaction with particularly reactive chain lengthening agents, such as diamines, is advantageously carried out in indifferent polar solvents. Moldings, such as filaments, threads, films, sheeting or coatings, may be prepared from the solutions of the elastomers in a conventional way by removing the solvent during the shaping process. The polyesters to be used according to the invention should have a molecular weight of 500 to 5000, preferably 1500 to 2500, adipic acid being mainly used as the acid component. Up to 10% (on the adipic acid) of other dicarboxylic acids, such as sebacic acid, pimelic acid, suberic acid or isophathalic acid may however be in corporated. The polyesters should contain (on the diol mixture) at least 45% and at most 90% by weight of hexanediol-1,6 and at least 10% and at most 55% by weight of 2,2-dimethylhexanediol-1,3. Particularly suitable polyesters contain at least 60% and at most 83% by weight of hexanediol-1,6 and at least 17% and at most 40% by weight of 2,2-methylhexanediol-1,3 in polycondensed form.

Examples of suitable diisocyanates are:

diphenylmethane diisocyanate-4,4′,
toluylene diisocyanate-2,6,
toluylene diisocyanate-2,4,
p-phenylene diisocyanate,
naphthylene diisocyanate-1,5, and
hexane diisocyanate-1,6.

Diols, such as ethylene glycol, butanediol-1,4; diamines, such as ethylene diamine, m-xylylene diamine, hydrazine, dihydrazides or water, may be used as chain lengthening agents.

Examples of suitable indifferent polar solvents are: dimethylformamide, dimethylacetamide, tetramethylurea, dimethylsulfoxide. These solvents may be mixed with less polar solvents, such as tetrahydrofuran or dioxane.

The invention is further illustrated by the following examples in which parts are by weight.

Example 1

(a) Production of the polyester.—2336 parts of adipic acid, 1699 parts of hexanediol-1,6 and 525.6 parts of 2,2-dimethylhexanediol-1,3 are esterified by raising the temperature to 200° C. while removing water of reaction by means of 120 parts of benzene as entrainer. Towards the end, the esterification is completed under subatmospheric pressure (oil pump) and at the same time the remainder of the entrainer is removed. A copolyester is obtained having an acid number of 1.2 and a hydroxyl number of 53.5.

(b) Production of the polymers.—630 parts of the above copolyester is stirred with 150 parts of 4,4′-diphenylmethane diisocyanate for two hours at 100° C. while excluding moisture, the reactor being rinsed out with nitrogen. After the mixture has been cooled, its isocyanate content is 3.21%. The whole is diluted with 780 parts of purified dimethylformamide and while stirring vigorously at room temperature a solution of 23.4 parts of ethylene diamine hydrate in 6430 parts of dimethylformamide is added. The viscosity of the solution increases considerably; it is 63.8 centipoises at 25° C. in the about 10% solution. After it has been concentrated to a solids content of about 30%, the viscosity is determined as 232 centipoises at 25° C.

(c) Spinning the solution.—The solution obtained according to (b) is spun on a conventional dry spinning plant with an output of 16.5 g./min. through a spinneret having twelve holes 0.2 mm. in diameter with a take-up speed of 180 m./min. Highly elastic threads are obtained having the following properties:

Titer _____ denier__ 195
Elongation _____ percent__ 540
Tensile strength (with reference to the initial cross-section) _____ g./den__ 0.73
Tensile strength (with reference to the cross-section at break) _____ g./den__ 4.68
Load at 200% elongation _____ g./den__ 0.10
Load at 400% elongation _____ g./den__ 0.35

The elastomers exhibit a remarkable resistance to hydrolysis. After having been treated for twenty-four hours with 10% caustic soda solution at 40° C., the threads exhibit more than 75% residual strength. A sample having a similar composition but with a polyester component of adipic acid/ethylene glycol/propylene glycol disintegrates under these conditions.

Example 2

(a) Production of the polyester.—2324 parts of adipic acid, 1586 parts of hexanediol-1,6 and 654 parts 2,2-dimethylhexanediol-1,3 (molar ratio of the diols 3:1, weight ratio 70.8:29.2) are reacted under the conditions speccified in Example 1(a). A copolyester is obtained having an acid number of 1.2, a hydroxyl number of 50 and a melting point of 34° C.

(b) Production of the polymer.—1100 parts of the copolyester 2(a) is heated with 250 parts of 4,4′-diphenylmethane diisocyanate for two hours at 100° C. The isocyanate content of the adduct after it has been cooled to room temperature is 3.21%. The product is diluted with 3480 parts of purified dimethylformamide and while stirring intensely a solution of 39 parts of ethylene diamine hydrate in 1170 parts of dimethylformamide is added.

(c) Production of sheeting.—The highly visous polymer solution obtained under (b) is poured in a layer having a thickness of 3 mm. onto a sheet of glass and the solvent is evaporated at elevated temperature. Highly elastic sheeting is obtained which has good resistance to hydrolytic degradation. It has a tensile strength of 260 kg./sq. cm. and an elongation of 694%.

Example 3

(a) Production of the polyester.—2373 parts of adipic acid, 1914 parts of hexanediol-1,6 and 296 parts of 2,2-dimethylhexanediol-1,3 (molar ratio of the diols 8:1, weight ratio 86.6:13.4) are esterified as described under 1(a). A copolyester is formed having an acid number of 1.1, a hydroxyl number of 50 and a melting point of 44° C.

(b) Production of the polymer.—1100 parts of the copolyester 3(a) is heated with 250 parts of 4,4-diphenylmethane diisocyanate for two hours at 100° C. The adduct is cooled to room temperature and then has an isocyanate content of 3.00%. It is diluted with 3480 parts of purified dimethylformamide and while stirring intensely a solution of 39 parts of ethylene diamine hydrate in 1170 parts of dimethylformamide is added. The about 23% polymer solution thus obtained has a viscosity of 556 poises at 25° C.

(c) Production of sheeting.—The highly viscous polycording to Example 3(c) from the solution obtained under (b) is highly elastic and very resistant to hydrolysis. It has a tensile strength of 570 kg./sq. cm. and an elongation of 640%.

We claim:

1. A polyurethane prepared by reacting (1) a polyester having at least two hydroxy groups and a molecular weight of between 500 and 5,000 prepared from adipic acid and a diol mixture comprising 45% to 90% by weight of 1,6-hexanediol and 10% to 55% by weight of 2,2 - dimethyl - 1,3 - hexanediol first with (2) an organic polyisocyanate and then reacting the isocyanate-modified polyester with (3) a chain lengthening agent.

2. The polyurethane of claim 1 in the form of a fiber.

3. The polyurethane of claim 1 in the form of sheeting.

References Cited

UNITED STATES PATENTS 2,729,618   1/1956   Muller et al. _____ 260—75

FOREIGN PATENTS 772,699   11/1967   Canada.

OTHER REFERENCES

Chemical Abstract, vol. 65, No. 7, pp. 10718 and 10719, Sept. 26, 1966.

DONALD E. CZAJA, Primary Examiner

M. J. WELSH, Assistant Examiner